United States Patent
Madsen

(10) Patent No.: US 9,108,518 B2
(45) Date of Patent: Aug. 18, 2015

(54) AXLE TORQUE CONTROL CORRESPONDING TO WHEEL SIZES

(71) Applicant: Electro-Motive Diesel, Inc., Lagrange, IL (US)

(72) Inventor: John Ernst Nielsen Madsen, Lemont, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 73 days.

(21) Appl. No.: 13/914,703

(22) Filed: Jun. 11, 2013

(65) Prior Publication Data

US 2014/0365046 A1 Dec. 11, 2014

(51) Int. Cl.
*G05D 1/00* (2006.01)
*B60L 15/00* (2006.01)
*B61C 3/00* (2006.01)
*B60L 15/38* (2006.01)

(52) U.S. Cl.
CPC ............... *B60L 15/002* (2013.01); *B60L 15/38* (2013.01); *B61C 3/00* (2013.01); *B60L 2200/26* (2013.01); *B60L 2210/40* (2013.01); *B60L 2220/12* (2013.01); *B60L 2220/42* (2013.01); *B60L 2220/46* (2013.01); *B60L 2240/423* (2013.01); *B60L 2240/465* (2013.01); *B60L 2240/526* (2013.01); *B60L 2240/527* (2013.01); *B60L 2240/622* (2013.01)

(58) Field of Classification Search
USPC ................................................ 701/19, 69–70
See application file for complete search history.

(56) References Cited

U.S. PATENT DOCUMENTS

| 4,819,168 | A | 4/1989 | Laskey |
| 5,841,254 | A | 11/1998 | Balch et al. |
| 6,148,269 | A | 11/2000 | Kumar et al. |
| 6,634,303 | B1 | 10/2003 | Madsen et al. |
| 2002/0033291 | A1* | 3/2002 | Iida et al. .......... 180/234 |
| 2004/0059494 | A1* | 3/2004 | Yoneda ............ 701/89 |
| 2007/0046220 | A1 | 3/2007 | Alton, Jr. et al. |
| 2009/0095195 | A1 | 4/2009 | Kumar et al. |
| 2012/0073467 | A1 | 3/2012 | Geraud et al. |
| 2012/0116617 | A1 | 5/2012 | Schaffler et al. |
| 2012/0253565 | A1* | 10/2012 | Kumar et al. ............ 701/19 |
| 2013/0060440 | A1* | 3/2013 | Fukushiro .............. 701/70 |
| 2013/0073159 | A1* | 3/2013 | Foret et al. ............ 701/69 |
| 2013/0073167 | A1* | 3/2013 | Guegan et al. ........... 701/89 |
| 2013/0211678 | A1* | 8/2013 | Lee et al. ................ 701/42 |
| 2014/0197769 | A1* | 7/2014 | Kojiya et al. ............ 318/473 |

FOREIGN PATENT DOCUMENTS

EP 0919447 6/1999

* cited by examiner

*Primary Examiner* — Hussein A. Elchanti
(74) *Attorney, Agent, or Firm* — Finnegan, Henderson, Farabow, Garrett & Dunner, LLP

(57) ABSTRACT

A system and method is disclosed for controlling at least one traction motor driving an axle on a vehicle. The vehicle includes a plurality of axles on which wheels are mounted. The method may include determining whether at least one of the wheels on at least one of the axles differs in diameter from at least one other wheel on a different one of the axles by more than a threshold value. The method may also include increasing a torque provided by a traction motor driving an axle with at least one wheel that has a larger diameter than at least one other wheel on a different axle.

20 Claims, 2 Drawing Sheets

AXLE TORQUE CONTROL CORRESPONDING TO WHEEL SIZES

TECHNICAL FIELD

The present disclosure is directed to axle torque control and, more particularly, axle torque control corresponding to wheel sizes.

BACKGROUND

In many vehicular applications it is desirable to control the power applied to the drive train in a manner that reduces or prevents slip of the vehicle's wheels. Slip typically occurs when the torque applied to the wheels of the vehicle is larger than the maximum friction force between the wheels and the surface on which the wheels are riding. In a conventional locomotive, power control is provided by a throttle manually set by a locomotive operator. The throttle command is converted into electric current supplied to a plurality of electric traction motors. An alternator and rectifier bridge may supply direct current (DC) to a traction inverter, which may in turn provide controlled alternating current (AC) to one or more AC electric induction motors used as the traction motors for powering the wheels or other traction components of the vehicle. AC induction motors are widely used in automotive and industrial applications due, in large part, to their low cost, reliability, ruggedness, and simplicity. They typically consist of a stator and a rotor. The stator is a stationary member, and the rotor is a rotatable member positioned on a shaft within the stator. Coils are wound around both the stator and the rotor to form windings around each member. Applying an electric current to the stator windings produces a magnetic field that rotates at a frequency called the "synchronous frequency". The rotating magnetic field induces currents in the rotor windings, which in turn, produce another magnetic field.

The two magnetic fields interact by trying to align themselves with each other. This interaction produces a torque, which urges the rotor to rotate. A maximum torque is achieved when the fields are furthest from alignment, and a zero torque is achieved when the fields are aligned (i.e., when the rotor rotates at the synchronous frequency). The difference between the actual rotational frequency of the rotor and the synchronous frequency is called the "slip frequency" and sometimes acts as a factor used in algorithms to control the speed of the motor.

U.S. Patent Application Publication No. 2012/0116617 to Schaffler et al. (Schaffler), published on May 10, 2012, discloses a system and method that provides traction control for wheels on a vehicle in order to provide a substantially similar tractive force exerted by wheels of different sizes on a corresponding surface. Schaffler specifically adjusts the torque applied to wheels of different sizes in order to improve vehicle track adhesion. This means that for wheels of larger size, Schaffler must reduce the torque applied in order to avoid excessive slippage of the larger wheel and reduced track adhesion.

By increasing vehicle track adhesion for all of the wheels on a vehicle, regardless of the size of each wheel, Schaffler does nothing to address the actual cause of excessive slipping or sliding of wheels, which is at least partially a result of the different wheel sizes. The present disclosure is directed towards overcoming one or more of the problems set forth above.

SUMMARY OF THE INVENTION

In one aspect, the present disclosure is directed to a method for controlling at least one traction motor driving an axle on a vehicle. The vehicle may include multiple axles on which wheels are mounted. The method may include determining whether at least one of the wheels on at least one of the axles differs in diameter from at least one other wheel on a different one of the axles by more than a threshold value. The method may further include increasing a torque provided by a traction motor driving an axle with at least one wheel that has a larger diameter than at least one other wheel on a different axle.

In a further aspect, the present disclosure is directed to a system for independently controlling individual axles of a plurality of axles on a vehicle based at least in part on the diameters of wheels mounted on each of the plurality of axles. The system may include a separate traction motor coupled to each of the plurality of axles on the vehicle. The system may further include a controller configured for determining whether at least one of the wheels mounted on at least one of the plurality of axles differs in diameter from at least one other wheel on a different one of the axles by more than a threshold value. The controller may also be configured for increasing a torque provided by a traction motor driving an axle with at least one wheel that has a larger diameter than at least one other wheel on a different axle.

In yet another aspect, the present disclosure is directed to a mobile vehicle that may include an electrical power source, multiple axles, and at least a pair of wheels mounted on each of the axles. The mobile vehicle may also include multiple traction motors, with each of the traction motors drivingly coupled to a separate one of the plurality of axles, and electrically coupled to receive electrical power from the electrical power source. Multiple inverters may also be included, with each of the inverters coupled to a separate one of the traction motors. The mobile vehicle may further include a controller configured for determining whether at least one of the wheels mounted on at least one of the axles differs in diameter from at least one other wheel on a different one of the axles by more than a threshold value. The controller may increase a torque provided by a traction motor driving an axle with at least one wheel that has a larger diameter than at least one other wheel on a different axle. This may be accomplished by increasing at least one of voltage and frequency supplied by an inverter to the traction motor.

DETAILED DESCRIPTION

Figure 1:
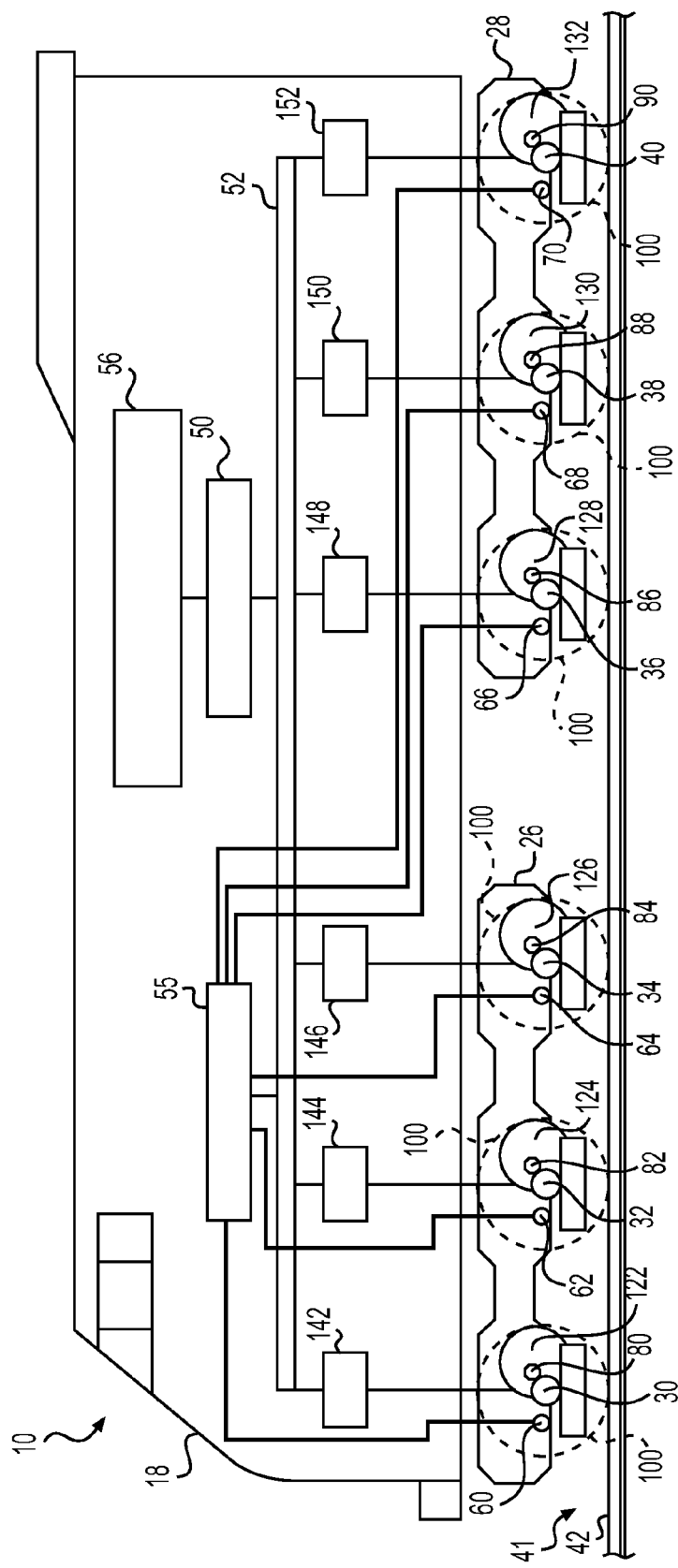
FIG. 1 is a pictorial illustration of a system according to an exemplary implementation of the disclosure.

FIG. 1 illustrates a wheel size equalization system 10 on a locomotive 18. Although system 10 is illustrated on a locomotive 18, one of ordinary skill in the art will recognize that system 10 may be utilized with other vehicles, including wheeled vehicles, rail vehicles, and track vehicles. With reference to FIG. 1, the system 10 is provided for selectively and/or dynamically controlling the power provided to each axle in order to control the amount of slip of wheels on each axle relative to rails 42 of a track 41 along which locomotive 18 is traveling. In various implementations of the present disclosure, system 10 may increase the amount of slip of wheels that are determined to have a larger diameter than at least one other wheel on a different axle in order to induce wear of the larger diameter wheel in accordance with the initiation of a wheel size equalization procedure. A threshold value for a determined difference in wheel diameters on different axles that may result in the initiation of a wheel size equalization procedure may be a function of at least one of regulations, historical norms, and empirical values that enable the vehicle to achieve operational goals. Alternatively, in a dynamic braking situation, system 10 may selectively and/or dynamically control the amount of slide of wheels on each axle relative to rails 42 in order to control the amount of electrical power that is regenerated or dissipated by induction traction motors connected to each axle, and/or increase the amount of wear on a larger diameter wheel.

As shown in FIG. 1, in one exemplary implementation, locomotive 18 may include a diesel engine 56 configured for driving an alternating current (AC) generator 50 in conjunction with a bank of rectifiers to provide DC electrical power through a DC bus 52 to a plurality of inverters 142, 144, 146, 148, 150, 152. In alternate implementations, locomotive 18 may include other engine configurations, such as one or more of a gasoline engine, a biodiesel engine, or a natural gas engine. Each of the inverters may be configured to convert the DC power received from DC bus 52 to alternating current (AC) power to drive each of a plurality of respective AC traction motors 122, 124, 126, 128, 130, 132. A controller 55 may be configured to provide control instructions to each of the inverters based at least in part upon data received from a plurality of sensors 60, 62, 64, 66, 68, 70, which may provide information on angular velocities of each wheel 100. Additionally or in the alternative, controller 55 may be configured to provide control instructions to each of the inverters based at least in part upon a detected slip frequency of an associated AC traction motor. As mentioned above, the slip frequency of an induction motor may be determined as a function of a difference between the actual rotational frequency for the rotor of the motor and the synchronous frequency at which a magnetic field produced by the stator windings is rotating. As discussed in more detail below, controller 55 may be configured to determine the relative diameters of each wheel 100 from at least one of relative angular velocities of each wheel or relative slip frequencies of each traction motor driving each wheel.

Locomotive 18 may also include two or more trucks 26, 28, which are each configured to receive a plurality of axles 30, 32, 34, and 36, 38, 40, respectively. Locomotive 18 may be configured to travel along rails 42 of track 41, and may include a plurality of wheels 100 that are each received by a respective axle 30, 32, 34, 36, 38, 40. FIG. 1 only shows a view from one side of locomotive 18, but each of the axles will typically include a pair of wheels, with one wheel at each end of each axle. As shown in FIG. 1, various implementations of this disclosure may include a separate inverter 142, 144, 146, 148, 150, 152 provided for each traction motor 122, 124, 126, 128, 130, 132. Each of the traction motors may drive an associated axle through a corresponding gear 80, 82, 84, 86, 88, 90. One of ordinary skill in the art will recognize that different and/or additional drive train components may be provided between each traction motor and an associated axle. Alternative implementations may also include only select axles on each truck actually being driven by associated traction motors. The provision of a separate inverter for each traction motor enables individualized control of the power provided to each separate traction motor, and therefore individualized control of the actual driving torque output by each traction motor to an associated axle. Sensors 60, 62, 64, 66, 68, 70 may also be provided in association with each axle or wheel in order to provide feedback to controller 55 regarding the angular velocity or other parameter(s) of each axle or wheel. This configuration enables selective control of the power provided to each traction motor associated with each axle by controlling one or more of voltage, frequency, amplitude, and phase of current provided to each AC traction motor by each associated inverter.

In alternative implementations, the traction motors may be DC motors directly employing the output of AC generator 50 after rectification and transmission along DC bus 52. In various implementations, DC electrical power from DC bus 52 may be processed by one or more DC chopper circuits that convert the DC power using pulse width modulation and/or other converting techniques for use by the DC traction motors. Each traction motor may also act as a generator providing dynamic or regenerative braking to assist in slowing down locomotive 18. In particular, during dynamic braking, a traction motor may provide torque in a direction that is opposite from the rolling direction, thereby generating electricity that may be used to regenerate a power storage device, or that may be dissipated as heat by a grid of resistors (not shown) connected to the electrical bus.

Each of inverters 142, 144, 146, 148, 150, 152 may include various components such as, for example, insulated gate bipolar transistors (IGBTs), microprocessors, capacitors, memory storage devices, and any other components that may be used for operating AC traction motors 122, 124, 126, 128, 130, 132. Other components that may be associated with the inverters include power supply circuitry (not referenced) and signal conditioning circuitry (not referenced), among others. Each of the inverters may manipulate and apply varying voltages and/or frequencies to a current generated by DC generator 50, and further conduct the resulting AC power to an associated AC traction motor. By manipulating one or more of the frequency, voltage, amplitude, and phase of the electric current provided to the AC traction motors, the inverters may control the speed and torque of each traction motor independently from each other traction motor.

Controller 55 may take many forms, including, for example, a computer based system, a microprocessor based system, a microcontroller, or any other suitable control type circuit or system. Controller 55 may include various components for running software applications designed to control each of the inverters and in turn each of the traction motors. For example, controller 55 may include a central processing unit (CPU), a random access memory (RAM), input/output (I/O) elements, one or more processors, and/or processing modules. In particular, controller 55 may include one or more inverter control modules dedicated to providing control signals to each of the inverters in order to manipulate the electric current being supplied to each of the traction motors. In various implementations of the disclosure controller 55 may include various subsystems, which interact with each other to produce a desired rotor speed and torque for each traction motor. Such subsystems may include a torque controller and flux controller for interpreting data sensed by a sensor 60, 62, 64, 66, 68, 70 located on or in proximity to each wheel 100, axle 30, 32, 34, 36, 38, 40, and/or traction motor 122, 124, 126, 128, 130, 132. Controller 55 may also include a target current calculator, which may use the interpreted data to calculate a desired current. Controller 55 may further include a vector controller and/or a slip controller, which may set at least one of the desired voltage, frequency, amplitude, and phase values to be applied by inverters 142, 144, 146, 148, 150, 152 to the current passing through stator conductors of each associated traction motor. Additionally, controller 55 may include an inverter voltage controller for transforming the vector and slip controller outputs into a form useful to each inverter.

Additional information provided to controller 55 may include information on the geographical location of locomotive 18 at any point in time. Various known mechanisms for identifying the geographical location of locomotive 18 may include global positioning system (GPS) sensors, proximity sensors located on or near track 41, and other motion sensors that may provide cumulative distance traveled by locomotive 18 from known starting points. This location information may enable controller 55 to take into consideration upcoming changes in grade or other characteristics of track 41 that may affect the amount of power required from locomotive 18 to achieve parameters such as travel speed, elapsed travel time, fuel efficiency, reduction in emissions, and life expectancy of various components. For example, when location information provided to controller 55 indicates that a ruling grade (which is typically the steepest grade on any given stretch of track) is approaching, controller 55 may be configured to provide signals to each of the inverters to adjust voltage and/or frequency for each associated traction motor to increase locomotive drawbar pull. Drawbar pull is generally the total force available to the locomotive for pulling rolling stock after overcoming its own tractive resistance.

Controller 55 may be configured to provide control signals to the inverters at times when a ruling grade is approaching or at hand such that the torque provided to an axle having at least one wheel of a larger diameter than at least one wheel on a different axle is reduced. A wheel having a larger diameter and therefore circumference than another wheel on a different axle of locomotive 18 may rotate more slowly than the wheel having a smaller diameter for the same distance traveled along a rail 42. Therefore, if the torque provided to the two wheels of different diameters is equal, the larger diameter wheel may generally slip relative to corresponding rail 42 along which both wheels are traveling. Accordingly, the pulling capability, or drawbar pull of locomotive 18 may be increased at times when needed, such as when traveling up a ruling grade, by decreasing the torque provided by each traction motor to an associated axle to reduce or eliminate slippage of larger wheels.

In situations when the load on a larger diameter wheel is large enough to prevent it from physically slipping relative to a corresponding rail 42, the traction motor driving the axle on which the larger diameter wheel is mounted may nevertheless experience a higher slip frequency. As discussed above, a higher slip frequency for an AC induction motor such as traction motors 122, 124, 126, 128, 130, 132 means a larger difference between the actual rotational frequency of the rotor of the motor and the synchronous frequency of the rotation of a magnetic field produced by the stator windings of the motor. A higher slip frequency for an induction motor therefore generally coincides with a higher torque being generated by the motor.

In accordance with various implementations of this disclosure, the provision of a separate inverter for every separate traction motor on locomotive 18 may enable controller 55 to provide customized control signals to each inverter. Controller 55 may also be configured to receive signals from each traction motor, or from sensors associated with each traction motor, and compare parameters for each traction motor as indicated by the received signals. A signal received by controller 55 from a particular traction motor may be indicative of that particular traction motor experiencing a higher slip frequency than another traction motor driving a different axle on locomotive 18. Based on input indicative of a higher slip frequency for a particular traction motor, controller 55 may be configured to interpret the presence of a higher slip frequency as an indication that at least one of the wheels mounted on the axle driven by that particular traction motor is larger in size than at least one other wheel on at least one other axle. Controller 55 may be configured to base this interpretation of a higher slip frequency at least in part on the same voltage and/or frequency being applied to each of the traction motors that are being compared.

Controller 55 may be further configured to further increase the torque of a particular traction motor experiencing a higher slip frequency in order to induce slippage between the one or more larger diameter wheels mounted on the axle driven by the particular traction motor and rail 42. Alternatively or in addition, controller 55 may be configured to process other input indicative of a different angular velocity of a particular wheel or axle driven by that particular traction motor. Based on input indicative of a slower angular velocity of a larger diameter wheel being driven by a traction motor, controller 55 may be configured to increase the torque of the traction motor driving the axle with the larger diameter wheel. Controller 55 may be configured for determining whether at least one of the wheels on at least one of the axles of locomotive 18 differs in diameter from at least one other wheel on a different axle by more than a threshold amount. As discussed above, the threshold amount may be a function of at least one of regulations, historical norms, and empirical values that enable the vehicle to achieve operational goals. The threshold amount may also vary depending on how much of a difference in diameter between wheels on different axles is needed before any significant increase in actual slippage of a larger diameter wheel occurs, or before any significant change in slip frequency of the traction motors occurs. Induced slippage between a larger diameter wheel and rail 42 may increase the rate at which the larger diameter wheel is worn down, and may therefore provide a wheel size equalization procedure that can be followed by controller 55.

A traction motor being operated at a higher torque, such as during a wheel size equalization procedure, may be operating at a higher current draw, and may therefore run at a hotter temperature than other traction motors on locomotive 18. Controller 55 may be further configured to control one or more of voltages, frequencies, amplitude, and phase of the current being provided to the traction motors to avoid exceeding their thermal ratings. Controller 55 may also be configured to make a determination when the wheel size equalization procedures may be acceptable. In various implementations of this disclosure, controller 55 may be configured to only command increased torque output by a traction motor to induce wear on the driven wheels when locomotive 18 is not approaching or traversing a ruling grade.

Figure 2:
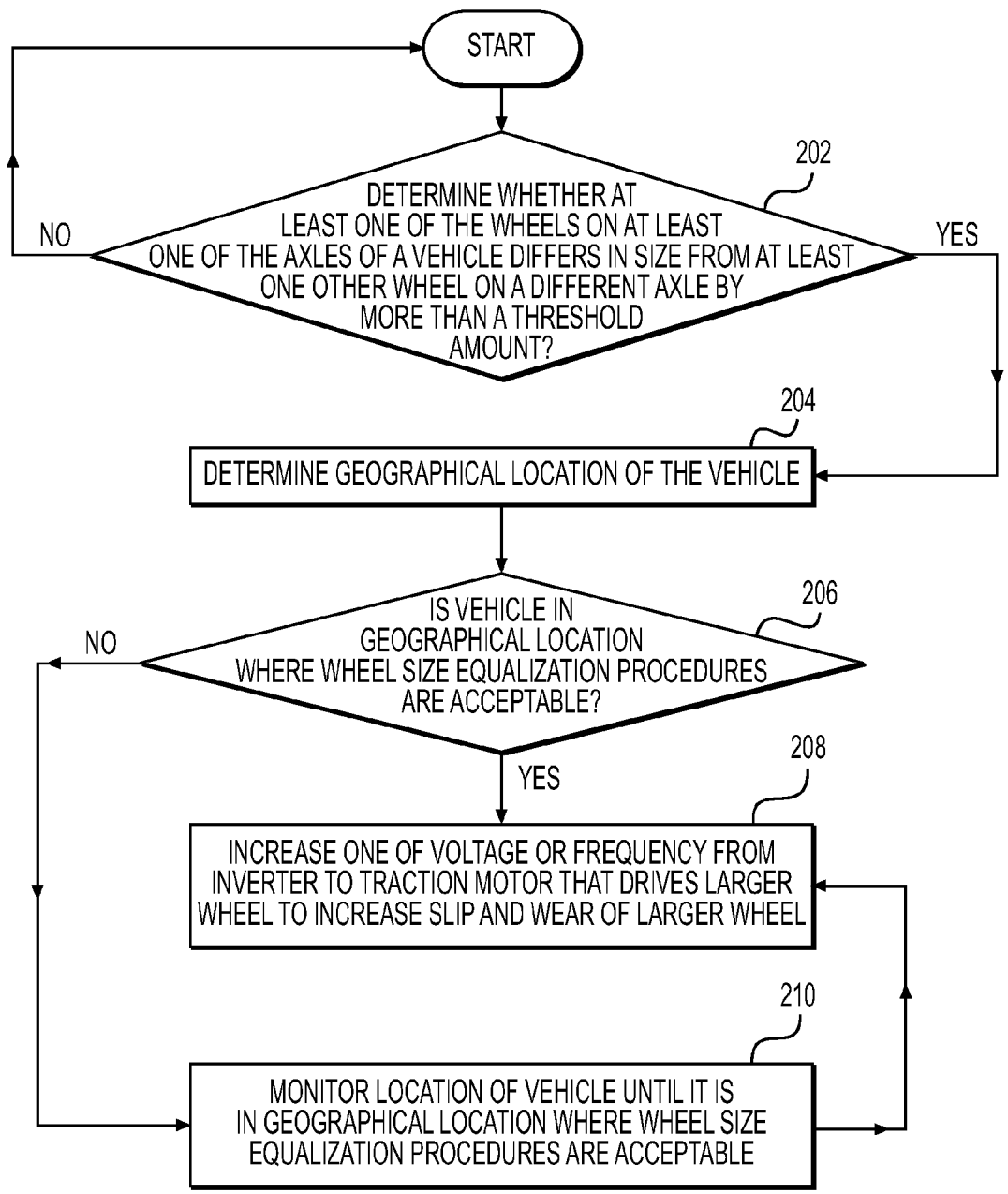
FIG. 2 is a flow diagram of a method, according to an exemplary implementation of the disclosure.

FIG. 2 illustrates an exemplary implementation of a method that may be performed by the system shown in FIG. 1. FIG. 2 will be discussed in more detail below to further illustrate the disclosed concepts.

INDUSTRIAL APPLICABILITY

The disclosed system and method for providing individualized axle torque control that may correspond to wheel sizes on the axles may provide benefits including equalization of wheel sizes on a locomotive. As a result, when traction motors need to be replaced for various reasons including electrical failure, various implementations of this disclosure may reduce or eliminate any need to match a new motor to a particular wheel size, or any need to machine an oversized wheel. Various implementations of the system and method of the present disclosure may provide a convenient, inexpensive, effective, and virtually automatic procedure for equalizing the wheel sizes on a locomotive. The disclosed system and method for equalizing wheel sizes may further enhance compliance with Federal Railroad Administration (FRA) rules regarding wheel size variations on a locomotive.

FIG. 2 illustrates a flow diagram depicting an exemplary method of controlling individual axles driven by traction motors on a locomotive based on wheel sizes on the axles. A determination may be made as to whether at least one of the wheels on at least one of the axles of a vehicle differs in size from at least one other wheel on a different axle by more than a threshold amount (step 202). As discussed above, the threshold amount beyond which a difference in wheel sizes may trigger the wheel size equalization procedures may be based upon various factors. Historical, regulatory, and/or empirical data may be stored from which controller 55 may determine that a difference in wheel size is large enough to justify implementation of wheel size equalization procedures.

Following a determination that a difference in wheel size in excess of a threshold amount is present (step 202: yes) the geographical location of the vehicle may be determined at step 204. As discussed above, this determination may be made by controller 55 with the aid of input received from a GPS sensor or other input or calculations.

Controller 55 may then determine whether the vehicle is in a geographical location where wheel size equalization procedures are acceptable (step 206). An upcoming ruling grade may be at least one factor considered by controller 55 in making a determination that the vehicle is not currently in a geographical location where wheel size equalization is acceptable (step 206: no). As discussed above, controller 55 may make this determination in order to avoid inducing excessive wheel slippage to promote wheel wear when the goal is instead to increase drawbar pull for the locomotive. Controller 55 may improve drawbar pull for the locomotive when approaching or traversing a ruling grade by attempting to bring all wheels to a point of maximum traction, and avoiding over-slippage of any of the wheels. At the same time, control parameters may call for maintaining the operating temperatures of all of the traction motors within a narrow range of each other, particularly when approaching and traversing a ruling grade.

If the vehicle is determined to be in a geographical location where wheel size equalization procedures are acceptable (step 206: yes) then controller 55 may increase one or more of voltage and frequency from an inverter to an associated traction motor that drives an axle including a larger diameter wheel to increase slip and wear of the larger diameter wheel (step 208). As discussed above, an increase in the voltage and/or frequency supplied by an inverter to a traction motor generally results in an increase in the torque provided by that traction motor to its associated axle and wheels mounted on that axle. The increased torque may result in an increase in slippage of the larger diameter wheel relative to rail 42 until the wheel has been worn down to a size within the threshold range from the sizes of wheels on other axles of locomotive 18.

If the vehicle is determined to be in a geographical location where wheel size equalization procedures are not acceptable (step 206: no), such as when locomotive 18 is approaching or traversing a ruling grade, then controller 55 may continue to monitor the location of the vehicle until it is in a geographical location where wheel size equalization procedures are acceptable (step 210).

It will be apparent to those skilled in the art that various modifications and variations can be made in the disclosed system and method without departing from the scope of the disclosure. Other embodiments will be apparent to those skilled in the art from consideration of the specification and practice of the various implementations disclosed herein. It is intended that the specification and examples be considered as exemplary only, with a true scope being indicated by the following claims and their equivalents.

What is claimed is:

1. A method for controlling at least one traction motor driving an axle on a vehicle wherein the vehicle includes a plurality of axles on which wheels are mounted, and at least one sensor provided in association with at least one of the plurality of axles and the at least one traction motor to provide feedback to a controller, the method comprising:

determining by the controller using signals obtained from the at least one sensor whether at least one of the wheels on at least one of the axles differs in diameter from at least one other wheel on a different one of the axles by more than a threshold value; and selectively increasing a torque provided by a traction motor driving an axle with at least one wheel that has a larger diameter than at least one other wheel on a different axle by providing control signals from the controller to manipulate an electric current being supplied to the traction motor.

2. The method of claim 1, wherein determining by the controller whether a first one of the wheels on a first one of the axles differs in diameter from at least a second one of the wheels on a second one of the axles by more than a threshold value includes the controller comparing an angular velocity of the first one of the wheels or the first one of the axles with an angular velocity of the second one of the wheels or the second one of the axles on the vehicle.

3. The method of claim 1, wherein determining by the controller whether at least one of the wheels on a first one of the axles differs in diameter from at least a second one of the wheels on a second one of the axles by more than a threshold value includes the controller determining a slip frequency for a first traction motor driving the first one of the axles and a slip frequency for a second traction motor driving the second one of the axles.

4. The method of claim 3, wherein determining by the controller whether at least one of the wheels on a first one of the axles differs in diameter from at least a second one of the wheels on a second one of the axles by more than a threshold value includes:

determining by the controller an actual rotational frequency of a rotor for each of the respective first and second traction motors and a synchronous frequency of rotation of a magnetic field produced by stator windings of each of the respective first and second traction motors; and comparing with the controller any difference between the actual rotational frequency of a rotor on the first traction motor and the synchronous frequency of rotation of a magnetic field produced by stator windings of the first traction motor with any difference between the actual rotational frequency of a rotor on the second traction motor and the synchronous frequency of rotation of a magnetic field produced by stator windings of the second traction motor.

5. The method of claim 3, wherein the first traction motor and the second traction motor are each supplied with substantially the same voltage and frequency while the controller is determining the slip frequency for the first traction motor and the slip frequency for the second traction motor.

6. The method of claim 4, wherein the first traction motor and the second traction motor are each supplied with substantially the same voltage and frequency while the controller is determining an actual rotational frequency of a rotor for each of the respective first and second traction motors and a synchronous frequency of rotation of a magnetic field produced by stator windings of each of the respective first and second traction motors.

7. The method of claim 1, further including:
determining a geographical location of the vehicle; and
decreasing by the controller a torque provided by a traction motor driving an axle with at least one wheel that is larger in diameter than at least one other wheel on a different axle when the vehicle is in a geographical location where an increase in pulling capabilities for the vehicle is desired.

8. The method of claim 1, wherein increasing torque provided by a traction motor includes providing control signals from the controller to manipulate at least one of voltage, frequency, amplitude, and phase of current supplied to the traction motor by an inverter configured to receive DC current from a generator driven by an engine on the vehicle.

9. The method of claim 1, further including:
driving each of the plurality of axles on the vehicle with a separate traction motor; and
controlling the torque provided by each of the traction motors to each respective axle by providing control signals from the controller to a separate inverter for each of the traction motors.

10. The method of claim 1, wherein the threshold value is a function of at least one of regulations, historical norms, and empirical values that enable the vehicle to achieve operational goals.

11. A system for independently controlling individual axles of a plurality of axles on a vehicle based at least in part on the diameters of wheels mounted on each of the plurality of axles, the system comprising:
a separate traction motor coupled to each of the plurality of axles on the vehicle; and
a controller configured for:
determining whether at least one of the wheels mounted on at least one of the plurality of axles differs in diameter from at least one other wheel on a different one of the axles by more than a threshold value; and
increasing a torque provided by a traction motor driving an axle with at least one wheel that has a larger diameter than at least one other wheel on a different axle.

12. The system of claim 11, wherein the controller is further configured for:
determining whether a first one of the wheels on a first one of the axles differs in diameter from at least a second one of the wheels on a second one of the axles by more than a threshold value by comparing an angular velocity of the first one of the wheels or the first one of the axles with an angular velocity of the second one of the wheels or the second one of the axles on the vehicle.

13. The system of claim 11, wherein the controller is further configured for:
determining whether at least one of the wheels on a first one of the axles differs in diameter from at least a second one of the wheels on a second one of the axles by more than a threshold value by determining a slip frequency for a first traction motor driving the first one of the axles and a slip frequency for a second traction motor driving the second one of the axles.

14. The system of claim 13, wherein the controller is configured for determining whether at least one of the wheels on a first one of the axles differs in diameter from at least a second one of the wheels on a second one of the axles by more than a threshold value by:
determining an actual rotational frequency of a rotor for each of the respective first and second traction motors and a synchronous frequency of rotation of a magnetic field produced by stator windings of each of the respective first and second traction motors; and
comparing any difference between the actual rotational frequency of a rotor on the first traction motor and the synchronous frequency of rotation of a magnetic field produced by stator windings of the first traction motor with any difference between the actual rotational frequency of a rotor on the second traction motor and the synchronous frequency of rotation of a magnetic field produced by stator windings of the second traction motor.

15. The system of claim 13, wherein the controller is further configured for commanding a supply of substantially the same voltage and frequency to each of the first traction motor and the second traction motor while determining the slip frequency for the first traction motor and the slip frequency for the second traction motor.

16. The system of claim 14, wherein the controller is further configured for commanding a supply of substantially the same voltage and frequency to each of the first traction motor and the second traction motor while determining an actual rotational frequency of a rotor for each of the respective first and second traction motors and a synchronous frequency of rotation of a magnetic field produced by stator windings of each of the respective first and second traction motors.

17. The system of claim 11, wherein the controller is further configured for:
determining a geographical location of the vehicle; and
decreasing a torque provided by a traction motor driving an axle with at least one wheel that is larger in diameter than at least one other wheel on a different axle when the vehicle is in a geographical location where an increase in pulling capabilities for the vehicle is desired.

18. The system of claim 11, further including:
a separate inverter coupled to each of the separate traction motors; and wherein the controller is configured for controlling at least one of voltage, frequency, amplitude, and phase of current supplied to each of the separate traction motors by commands transmitted to each of the separate inverters.

19. The system of claim 11, wherein the controller is configured for determining the threshold value as a function of at least one of regulations, historical norms, and empirical values that enable the vehicle to achieve operational goals.

20. A mobile vehicle, comprising:
an electrical power source;
a plurality of axles;
at least a pair of wheels mounted on each of the plurality of axles;
a plurality of traction motors, each of the plurality of traction motors drivingly coupled to a separate one of the plurality of axles and electrically coupled to receive electrical power from the electrical power source;
a plurality of inverters, each of the plurality of inverters coupled to a separate one of the plurality of traction motors; and
a controller configured for:
determining whether at least one of the wheels mounted on at least one of the plurality of axles differs in diameter from at least one other wheel on a different one of the axles by more than a threshold value; and
increasing a torque provided by a traction motor driving an axle with at least one wheel that has a larger diameter than at least one other wheel on a different axle by increasing at least one of voltage and frequency supplied by an inverter to the traction motor in order to increase an amount of slip of the larger diameter wheel.

\* \* \* \* \*